(12) United States Patent
Krishnan

(10) Patent No.: US 11,544,296 B1
(45) Date of Patent: Jan. 3, 2023

(54) SYSTEMS AND METHODS FOR SPATIALLY-INDEXING AGRICULTURAL CONTENT

(71) Applicant: WINFIELD SOLUTIONS, LLC, Shoreview, MN (US)

(72) Inventor: Ananth Krishnan, Eden Prairie, MN (US)

(73) Assignee: WinField Solutions, LLC, Arden Hills, MN (US)

(*) Notice: Subject to any disclaimer, the term of this patent is extended or adjusted under 35 U.S.C. 154(b) by 746 days.

(21) Appl. No.: 15/266,337

(22) Filed: Sep. 15, 2016

(51) Int. Cl.
| | |
|---|---|
| G06F 16/29 | (2019.01) |
| G06F 16/44 | (2019.01) |
| G01S 19/14 | (2010.01) |
| A01B 79/00 | (2006.01) |
| E02F 9/26 | (2006.01) |
| E02F 9/20 | (2006.01) |

(52) U.S. Cl.
CPC .......... *G06F 16/29* (2019.01); *A01B 79/005* (2013.01); *E02F 9/2045* (2013.01); *E02F 9/261* (2013.01); *G01S 19/14* (2013.01); *G06F 16/444* (2019.01)

(58) Field of Classification Search
CPC ... G06F 17/30061; G06F 16/444; G06F 16/29
USPC ........................................................ 707/743
See application file for complete search history.

(56) References Cited

U.S. PATENT DOCUMENTS

| | | | | | |
|---|---|---|---|---|---|
| 5,467,271 | A | * | 11/1995 | Abel | A01B 79/005 |
| | | | | | 702/5 |
| 5,519,609 | A | * | 5/1996 | Kuchenrither | A01B 79/005 |
| | | | | | 340/539.2 |
| 5,686,671 | A | * | 11/1997 | Nelson | G01F 1/30 |
| | | | | | 73/861.73 |

(Continued)

FOREIGN PATENT DOCUMENTS

WO WO-2016086035 A1 * 6/2016 ........... G06F 3/0488

OTHER PUBLICATIONS

Usery et al., "Precision Farming Data Management Using Geographic Information Systems", Nov. 1995, Photogrammetric Engineering & Remote Sensing, vol. 61-11, pp. 1383-1391. 9 pages printed (Year: 1995).*

(Continued)

*Primary Examiner* — Tony Mahmoudi
*Assistant Examiner* — Michael Le
(74) *Attorney, Agent, or Firm* — Dorsey & Whitney LLP

(57) ABSTRACT

Computer systems and methods of spatially-indexing agricultural content involve inputting agricultural content comprising spatial data and spatially-indexing the agricultural are disclosed herein. In an example, the computer systems and methods involve identifying from the spatial data a set of geospatial boundaries for the agricultural content. The computer systems and methods also involve indexing the agricultural content to the identified geospatial boundaries. The computer systems and methods further involve cross-referencing the indexed agricultural data with a plurality of sets of geospatial boundaries for a plurality of fields. The (Continued)

| Field ID | Season | Field ID | Polygon |
|---|---|---|---|
| 31 | 2012 | 10011 | POLYGON((-93.19084167480469 44.45982765640475,-93.18938255310059 44.4598429716383,-93.18941473960876 44.45919207066915,-93.19079875946045 44.45918441296749,-93.19084167480469 44.45982765640475)) |
| 32 | 2013 | 10011 | POLYGON((-93.19084167480469 44.45982765640475,-93.1899619102478 44.4598429716383,-93.18987607955933 44.45915378215086,-93.19079875946045 44.45918441296749,-93.19084167480469 44.45982765640475)) |
| 33 | 2014 | 10011 | POLYGON((-93.19080948829651 44.4598736020933996,-93.19084167480469 44.45917675526485,-93.18864226341248 44.45917675526483,-93.18862080574036 44.45985062925358,-93.1894388794899 44.4598740806941,-93.18948447704315 44.45945338913591,-93.190176486969 44.459439031008806,-93.19016575813293 44.459869773287394,-93.19080948829651 44.459873602093396)) |
| 34 | 2012 | 10021 | POLYGON((-93.18942546844482 44.45985828686785,-93.18944692611694 44.45916909756118,-93.18864226341248 44.45917675526483,-93.18859934806824 44.45985828686785,-93.18942546844482 44.45985828686785)) |
| 35 | 2014 | 10021 | POLYGON((-93.18943619728088 44.45987437981957,-93.1901603937149 44.459870551013616,-93.190176486969 44.45943789432355,-93.18948447704315 44.45944938082577,-93.18943619728088 44.45987437981957)) | computer systems and methods additionally involve indexing the agricultural content to one or more of the plurality of fields when the cross-referencing identifies an overlap between the geospatial boundaries of the indexed agricultural data and one or more of the geospatial boundaries of the plurality of fields.

14 Claims, 14 Drawing Sheets

(56) References Cited

U.S. PATENT DOCUMENTS

| | | | | |
|---|---|---|---|---|
| 5,771,169 | A * | 6/1998 | Wendte | A01B 79/005 702/5 |
| 5,978,723 | A * | 11/1999 | Hale | A01B 79/005 701/409 |
| 6,008,756 | A * | 12/1999 | Boerhave | A01B 79/005 342/357.52 |
| 6,070,539 | A * | 6/2000 | Flamme | A01C 21/005 111/177 |
| 6,119,069 | A * | 9/2000 | McCauley | G06K 9/48 702/5 |
| 6,199,000 | B1 * | 3/2001 | Keller | A01C 21/005 701/50 |
| 6,236,907 | B1 * | 5/2001 | Hauwiller | A01B 79/005 111/200 |
| 6,421,610 | B1 * | 7/2002 | Carroll | G06F 16/58 702/5 |
| 6,687,616 | B1 * | 2/2004 | Peterson | A01B 79/005 702/5 |
| 7,068,816 | B1 | 6/2006 | Knoblauch et al. | |
| 8,051,087 | B2 * | 11/2011 | Campbell | G06F 16/9537 707/743 |
| 9,288,938 | B2 * | 3/2016 | Cavender-Bares | A01B 19/00 |
| 9,563,852 | B1 * | 2/2017 | Wiles | G06Q 10/04 |
| 9,880,140 | B2 * | 1/2018 | Osborne | G01N 33/0098 |
| 10,768,156 | B1 * | 9/2020 | Baron | G01N 33/0098 |
| 2002/0022928 | A1 * | 2/2002 | Ell | A01C 21/00 702/2 |
| 2002/0022929 | A1 * | 2/2002 | Ell | A01B 79/005 702/5 |
| 2002/0035431 | A1 * | 3/2002 | Ell | A01B 79/005 702/5 |
| 2002/0040300 | A1 * | 4/2002 | Ell | A01M 7/0089 705/26.1 |
| 2002/0173980 | A1 | 11/2002 | Daggett et al. | |
| 2003/0019408 | A1 * | 1/2003 | Fraisse | A01B 79/005 111/100 |
| 2003/0036852 | A1 * | 2/2003 | Ell | A01C 21/00 702/5 |
| 2003/0083819 | A1 * | 5/2003 | Rooney | G01V 11/00 702/5 |
| 2003/0135329 | A1 * | 7/2003 | Carroll | G06F 16/58 702/5 |
| 2003/0135330 | A1 * | 7/2003 | Carroll | G06F 16/58 702/5 |
| 2003/0208319 | A1 * | 11/2003 | Ell | A01B 79/005 701/50 |
| 2004/0264763 | A1 * | 12/2004 | Mas | G06K 9/00664 382/154 |
| 2005/0150160 | A1 * | 7/2005 | Norgaard | A01G 2/00 47/58.1 SE |
| 2006/0025927 | A1 * | 2/2006 | Hoskinson | A01B 79/005 702/1 |
| 2006/0287896 | A1 * | 12/2006 | McComb | G06Q 10/10 705/4 |
| 2008/0157990 | A1 * | 7/2008 | Belzer | G06Q 10/00 340/678 |
| 2009/0082964 | A1 * | 3/2009 | Robinson | A01B 79/005 701/469 |
| 2009/0132469 | A1 * | 5/2009 | White | G06Q 10/00 |
| 2009/0313215 | A1 * | 12/2009 | Maizel | G06Q 10/0637 707/999.102 |
| 2009/0319891 | A1 * | 12/2009 | MacKinlay | G06T 11/00 715/275 |
| 2011/0153556 | A1 * | 6/2011 | Macy | A01B 79/005 707/609 |
| 2011/0264575 | A1 * | 10/2011 | Kanitra | G06Q 30/02 705/35 |
| 2011/0270529 | A1 * | 11/2011 | Macy | A01C 21/00 702/19 |
| 2011/0295575 | A1 * | 12/2011 | Levine | G06Q 30/02 703/2 |
| 2012/0054174 | A1 * | 3/2012 | Gagnier | G06F 16/29 707/714 |
| 2012/0101634 | A1 * | 4/2012 | Lindores | A01B 79/005 700/266 |
| 2012/0101796 | A1 * | 4/2012 | Lindores | G06F 16/29 703/9 |
| 2012/0237083 | A1 * | 9/2012 | Lange | G06F 16/29 382/103 |
| 2013/0054654 | A1 * | 2/2013 | Sterling | G06F 16/29 707/803 |
| 2013/0173321 | A1 * | 7/2013 | Johnson | G06Q 50/02 705/7.12 |
| 2013/0174040 | A1 * | 7/2013 | Johnson | G06Q 10/06 715/733 |
| 2013/0275316 | A1 * | 10/2013 | Teng | G06Q 30/018 705/317 |
| 2014/0012732 | A1 * | 1/2014 | Lindores | G06Q 50/02 705/37 |
| 2014/0365083 | A1 * | 12/2014 | Covely | G06F 16/90335 701/50 |
| 2015/0006212 | A1 * | 1/2015 | Covely | G06Q 10/06311 705/7.13 |
| 2015/0186387 | A1 * | 7/2015 | Funabashi | G06F 16/24578 707/723 |
| 2015/0234767 | A1 * | 8/2015 | Tatge | H04L 67/12 710/306 |
| 2015/0254800 | A1 * | 9/2015 | Johnson | G06Q 50/02 382/141 |
| 2015/0310323 | A1 * | 10/2015 | Foster | G06K 19/06196 56/341 |
| 2016/0063639 | A1 * | 3/2016 | Groeneveld | G06Q 40/08 705/4 |
| 2016/0071223 | A1 * | 3/2016 | Rupp | G06Q 10/04 705/7.11 |
| 2016/0073573 | A1 * | 3/2016 | Ethington | G06Q 50/02 705/7.36 |
| 2016/0078569 | A1 * | 3/2016 | Ethington | G06Q 10/04 705/7.37 |
| 2016/0086032 | A1 * | 3/2016 | Pickett | G06T 1/0007 382/110 |
| 2016/0125331 | A1 * | 5/2016 | Vollmar | H04W 4/021 705/7.13 |
| 2016/0223511 | A1 * | 8/2016 | Koshnick | A01C 21/005 |
| 2016/0224703 | A1 * | 8/2016 | Shriver | G06Q 50/02 |
| 2016/0247082 | A1 * | 8/2016 | Stehling | G06N 7/005 |
| 2016/0308954 | A1 * | 10/2016 | Wilbur | H04L 67/18 |
| 2017/0199880 | A1 * | 7/2017 | Funabashi | G06F 16/532 |
| 2017/0277697 | A1 * | 9/2017 | Funabashi | G06F 16/444 |
| 2017/0344922 | A1 * | 11/2017 | Sauder | G06F 3/0488 |
| 2018/0070527 | A1 * | 3/2018 | Richt | A01B 79/005 |
| 2018/0330435 | A1 * | 11/2018 | Garg | G06Q 30/0283 |
| 2019/0050947 | A1 * | 2/2019 | Araki | G01C 7/04 |

OTHER PUBLICATIONS

Wardlow, Brian D. et al., "Large-area crop mapping using time-series MODIS 250 m NDVI data: An assessment for the U.S. Central Great Plains", Remote Sensing of Environment 112 (2008) pp. 1096-1116.

* cited by examiner

| Farm ID | Farm Name |
|---|---|
| 1001 | Farm 1 |
| 1002 | Farm 2 |

Fig. 5A

| Farm ID | Field ID | Field Name |
|---|---|---|
| 1001 | 10011 | Field 1-A |
| 1001 | 10012 | Field 1-B |
| 1002 | 10021 | Field 2-A |

Fig. 5B

| Season Field ID | Season | Field ID | Polygon |
|---|---|---|---|
| 31 | 2012 | 10011 | POLYGON((-93.19084167480469 44.45982765640475,-93.18938255310059 44.4598429716383,-93.18941473960876 44.45919207066915,-93.19079875946045 44.45918441296749,-93.19084167480469 44.45982765640475)) |
| 32 | 2013 | 10011 | POLYGON((-93.19084167480469 44.45982765640475,-93.1899619102478 44.4598429716383,-93.18987607955933 44.45915378215086,-93.19079875946045 44.45918441296749,-93.19084167480469 44.45982765640475)) |
| 33 | 2014 | 10011 | POLYGON((-93.19080948829651 44.459873602093396,-93.19084167480469 44.45917675526485,-93.18864226341248 44.45917675526483,-93.18862080574036 44.45985062925358,-93.1894388794899 44.4598740806941,-93.18948447704315 44.45945338913591,-93.190176486969 44.459439031008806,-93.19016575813293 44.459869773287394,-93.19080948829651 44.459873602093396)) |
| 34 | 2012 | 10021 | POLYGON((-93.18942546844482 44.45985828686785,-93.18944692611694 44.45916909756118,-93.18864226341248 44.45917675526483,-93.18859934806824 44.45985828686785,-93.18942546844482 44.45985828686785)) |
| 35 | 2014 | 10021 | POLYGON((-93.18943619728088 44.45987437981957,-93.1901603937149 44.459870551013616,-93.190176486969 44.45943789432355,-93.18948447704315 44.45944938082577,-93.18943619728088 44.45987437981957)) |

Fig. 5C

| Ag Resource ID | Season | Type | Polygon |
|---|---|---|---|
| 201 | 2012 | Yield | POLYGON((-93.18943619728088 44.45987437981957,-93.1909704208374 44.45986672220739,-93.19098651409149 44.459460867325745,-93.18948447704315 44.45944938082577,-93.18943619728088 44.45987437981957)) |
| 202 | 2013 | Yield | POLYGON((-93.19084167480469 44.45982765640475,-93.18991363048553 44.4598391428303,-93.18993240594864 44.4594964634962,-93.18987607955933 44.45915378215086,-93.19033205509186 44.45919972836976,-93.19079875946045 44.45918441296749,-93.19085776805878 44.45950603557193,-93.19084167480469 44.45982765640475)) |
| 203 | 2014 | Yield | POLYGON((-93.19080948829651 44.459873602093396,-93.19085776805878 44.45953283737569,-93.19084167480469 44.45917675526485,-93.18974196910858 44.4591461244442,-93.18864226341248 44.45917675526483,-93.18871200084686 44.45949837791146,-93.18862080574036 44.45985062925358,-93.1894388794899 44.4598740806941,-93.1894938647747 44.459663735293915,-93.18948447704315 44.45945338913591,-93.190176486969 44.459439031008806,-93.19013893604279 44.45965440254531,-93.19016575813293 44.459869773287394,-93.19080948829651 44.459873602093396)) |
| 204 | 2012 | Seed Rx | POLYGON((-93.1909704208374 44.45986672220739,-93.19098114967346 44.45944555199196,-93.1904125213623 44.45945320965935,-93.19025695323944 44.45952212862075,-93.19024622440338 44.45986672220739,-93.1909704208374 44.45986672220739)) |
| 205 | 2012 | Fert Rx | POLYGON((-93.19089531898499 44.45986672220739,-93.1908631324768 44.45944938082577,-93.1904125213623 44.45945320965935,-93.19022476673126 44.459434065489,-93.19024622440338 44.45986672220739,-93.19089531898499 44.45986672220739)) |
| 206 | 2013 | Yield | POLYGON((-93.18943619728088 44.45987437981957,-93.18966317921877 44.45987174751549,-93.1896648555994 44.459581954042115,-93.1898881494999 44.459576689407506,-93.18988412618637 44.45986863661053,-93.1909704208374 44.45986672220739,-93.19098651409149 44.459460867325745,-93.18948447704315 44.45944938082577,-93.18943619728088 44.45987437981957)) |
| 207 | 2014 | Yield | POLYGON((-93.18943619728088 44.45987437981957,-93.18979293107986 44.459860978997646,-93.19016039371449 44.459870551013616,-93.19018453359604 44.459654223069336,-93.190176486969 44.45943789432355,-93.18982779979706 44.45945895290925,-93.18948447704315 44.45944938082577,-93.1894388794899 44.459658051889484,-93.18943619728088 44.45987437981957)) |

Fig. 5D

| Ag Resource ID | Season Field IDs |
|---|---|
| 201 | 31 |
| 201 | 34 |
| 202 | 32 |
| 203 | 33 |
| 204 | 31 |
| 205 | 31 |
| 206 | 31 |

Fig. 5E

| Ag Resource ID | Field ID |
|---|---|
| 201 | 10011 |
| 201 | 10021 |
| 202 | 10011 |
| 202 | 10021 |
| 203 | 10011 |
| 204 | 10011 |
| 205 | 10011 |
| 206 | 10011 |
| 206 | 10021 |
| 207 | 10011 |
| 207 | 10021 |

Fig. 5F

| Season Field ID | Season | Field ID | Polygon |
|---|---|---|---|
| 31 | 2012 | 10011 | POLYGON((-93.1908416 7480469 44.4598276 5640475,-93.1893825 5310059 44.4598429 716383,-93.1894147 3960876 44.4591920 7066915,-93.1907987 5946045 44.4591844 1296749,-93.1908416 7480469 44.4598276 5640475)) |
| 32 | 2013 | 10011 | POLYGON((-93.1908416 7480469 44.4598276 5640475,-93.1899619 102478 44.4598429 716383,-93.1898760 7955933 44.4591537 8215086,-93.1907987 5946045 44.4591844 1296749,-93.1908416 7480469 44.4598276 5640475)) |
| 33 | 2014 | 10011 | POLYGON((-93.1908094 8829651 44.4598736 02093396,-93.1908416 7480469 44.4591767 5526485,-93.1886422 6341248 44.4591767 5526483,-93.1886208 05774036 44.4598506 29253358,-93.1894388 794899 44.4598740 8806941,-93.1894844 7704315 44.4594533 8913591,-93.1901764 86969 44.4594390 31008806,-93.1901657 5813293 44.4598697 73287394,-93.1908094 8829651 44.4598736 02093396)) |
| 34 | 2012 | 10021 | POLYGON((-93.1894254 6844482 44.4598582 8686785,-93.1894469 2611694 44.4591690 9756118,-93.1886422 6341248 44.4591767 5526483,-93.1885993 4806824 44.4598582 8686785)) |
| 35 | 2014 | 10021 | POLYGON((-93.1894361 97280884.4598743 7981957,-93.1901603 9371494.4598705 51013616,-93.1901764 86969 44.4594378 9432355,-93.1894844 7704315 44.4594493 80825577,-93.1894361 9728088 44.4598743 7981957)) |

Fig. 8

| Ag Resource ID | Season | Type | Polygon | Visual |
|---|---|---|---|---|
| 201 | 2012 | Yield | POLYGON((-93.1894361972808 44.4598743798195,-93.1909704208374 44.4598667222073,-93.1909865140914 44.4594608673257,-93.1894844770431 44.4594493808257,-93.1894361972808 44.4598743798195)) | |
| 202 | 2013 | Yield | POLYGON((-93.1908416748046 44.4598276564047,-93.1899136304855 44.4598391428230,-93.1899324059486 44.4594964634962,-93.1988760795593 44.4591537821508,-93.1903320550918 44.4591997283697,-93.1907987594604 44.4591844129674,-93.1908577680587 44.4595060355719,-93.1908416748046 44.4598276564047)) | |
| 203 | 2014 | Yield | POLYGON((-93.1908094829651 44.4598736020933,-93.1908577680587 44.4595328373756,-93.1908416748046 44.4591461244442,-93.1891767552648 44.4589741969108,-93.1897675526483 44.1887120008468,-93.1886422634124 44.4591767552648,-93.4595983779114 44.4598620805740,-93.1894388794899 44.4598740806941,-93.1894938364774,-93.1894938364774 44.4594533891359,-93.1901789360427 44.4596637352939,-93.1894844770431,-93.1901789360427 44.4598697732873,-93.1896544025453,-93.1901657581329 44.5987360209933,-93.1908094829651 44.4598736020933)) | |

Fig. 9

SYSTEMS AND METHODS FOR SPATIALLY-INDEXING AGRICULTURAL CONTENT

TECHNICAL FIELD

Implementations relate to approaches to storing agricultural content according to a spatial index for use in precision agricultural applications.

BACKGROUND

Description of the Art

US 2003/0208319 A1 discloses an approach for generating application maps for site-specific farming that uses mapping software to generate an application map for a field using field boundary information, which is validated to verify the integrity of the field boundary information.

US 2002/0173980 A1 discloses an approach for mapping fields by dividing the field into management zones, each of which represents land within the field that is homogenous with respect to risk factors related to crop failure.

Wardlow and Egbert disclose an approach for crop classification and land use practices in regions across the U.S. Central Great Plains on a state-by-state basis.

U.S. Pat. No. 7,068,816 B1 discloses the generation of agricultural information correlated to an area of interest where the area of interest is provided by a user requesting the agricultural information.

SUMMARY

Implementations provide methods, systems and computer program products for spatially-indexing agricultural content.

According to certain implementations, a computer-implemented method of spatially-indexing agricultural content involves: inputting agricultural content from memory operatively coupled with a computer system, where the agricultural content includes spatial data and spatially-indexing the agricultural content. Spatial indexing may proceed by: identifying from the spatial data a set of geospatial boundaries for the agricultural content, indexing the agricultural content to the identified geospatial boundaries, cross-referencing the indexed agricultural data with a plurality of sets of geospatial boundaries for a plurality of fields, and indexing the agricultural content to one or more of the plurality of fields when the cross-referencing identifies an overlap between the geospatial boundaries of the indexed agricultural data and one or more of the geospatial boundaries of the plurality of fields.

According to various implementations or alternatives, the plurality of sets of geospatial boundaries for a plurality of fields are contained in a data table, in which the data table includes columns for field identifiers and for geospatial coordinate identifiers, and a plurality of rows of the data table identifies an individual field and a set of geospatial coordinates defining the set of geospatial boundaries for the individual field.

According to various implementations or alternatives, the step of indexing the agricultural data to the identified geospatial boundaries involves outputting the indexed content to a data table, in which the data table includes columns for agricultural content type identifiers and for geospatial coordinate identifiers, and a plurality of rows of the data table identifies an agricultural content type and a set of geospatial coordinates defining the set of geospatial boundaries for the agricultural content.

According to various implementations or alternatives, the step of indexing the agricultural content to one or more of the plurality of fields involves indexing the agricultural content to a field for one growing season.

According to various implementations or alternatives, the agricultural content comprises sensed agricultural content from an agricultural sensor system of an agricultural vehicle. In addition or alternatively, the spatial data of the agricultural content includes inherent geospatial characteristics collected by the agricultural sensor system. The inherent geospatial characteristics may be x-y GPS coordinates, and each of the sets of geospatial boundaries for the plurality of fields may be x-y GPS coordinates. In addition or alternatively, the inherent geospatial characteristics comprise x-y-z GPS coordinates, and each of the sets of geospatial boundaries for the plurality of fields may be x-y-z GPS coordinates.

According to various implementations or alternatives, the method may additionally involve: receiving spatial search parameters from the interactive display, identifying one or more fields from the spatial search parameters using the plurality of sets of geospatial boundaries for the plurality of fields, and displaying the indexed agricultural content corresponding to the identified one or more fields. In such implementations or alternatives the spatial search parameters received may correspond to one or more of field coordinates, polygon coordinates, or GPS coordinates.

According to other implementations, a computer system includes a database in communication with the computer processor, the database comprising memory for storing agricultural content, the agricultural content comprising spatial data and a computer processor configured to spatially-index the agricultural content, where the computer processor: identifies from the spatial data a set of geospatial boundaries for the agricultural content, indexes the agricultural content to the identified geospatial boundaries, cross-references the indexed agricultural data with a plurality of sets of geospatial boundaries for a plurality of fields, and indexes the agricultural content to one or more of the plurality of fields when the cross-referencing identifies an overlap between the geospatial boundaries of the indexed agricultural data and one or more of the geospatial boundaries of the plurality of fields.

According to various implementations or alternatives, the computer processor is operatively coupled to an interactive display, the computer processor is further configured to: receive spatial search parameters from the interactive display; identify one or more fields from the spatial search parameters using the plurality of sets of geospatial boundaries for the plurality of fields; and display the indexed agricultural content corresponding to the identified one or more fields. In such implementations and alternatives, the spatial search parameters received correspond to one or more of field coordinates, polygon coordinates, or GPS coordinates.

BRIEF DESCRIPTION OF THE DRAWINGS

FIGS. 5A-5F illustrate data tables that may be used in connection with indexing grower information using geospatial boundary information, according to certain implementations.

FIG. 8 illustrates the table of FIG. 5C along with visual depictions of fields for the various given seasons based on the polygon coordinates listed in the table.

FIG. 9 illustrates a portion of the table of FIG. 5D with a visual depiction of the geospatial area covered related to the agricultural resource ID based on the polygon coordinates listed in the table.

DETAILED DESCRIPTION

Figure 1A:
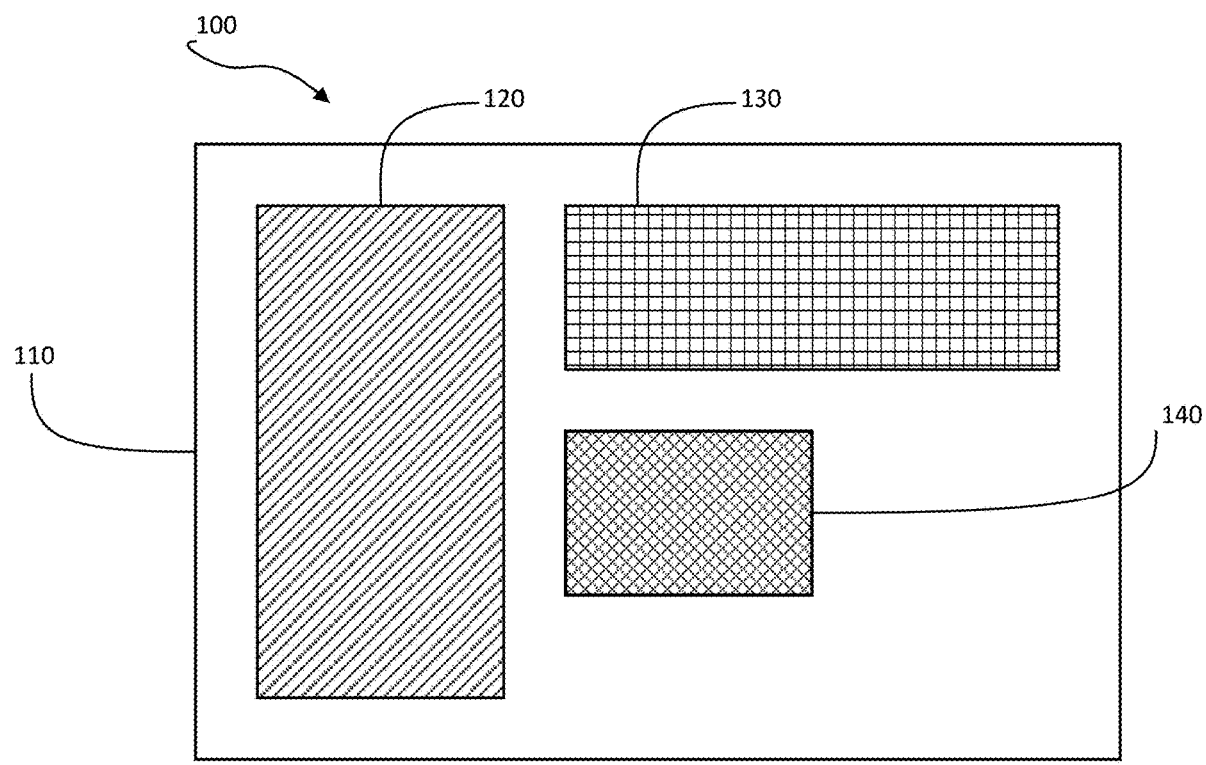
FIG. 1A schematically illustrates three fields on a parcel of land for a given growing season.
Figure 1B:
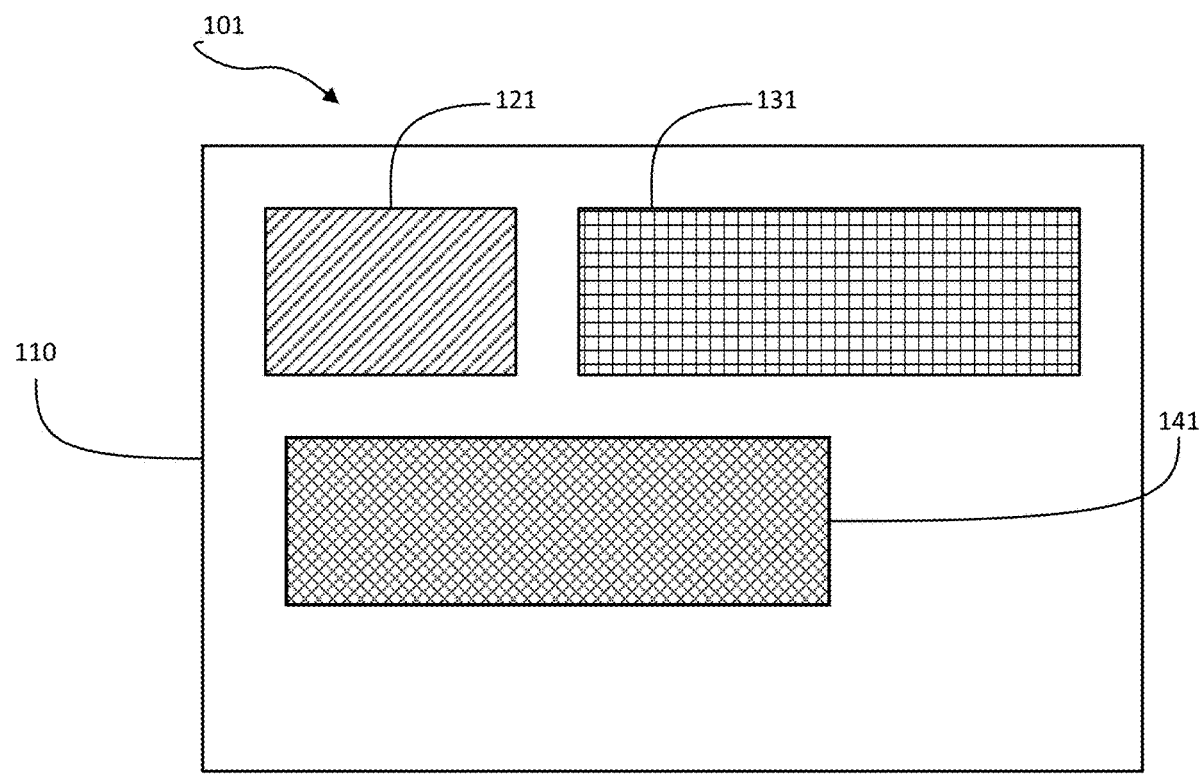
FIG. 1B schematically illustrates three fields on the parcel of land of FIG. 1A for a different growing season.

In the field of agriculture, a grower typically divides their land into multiple fields. For instance, FIG. 1A schematically illustrates, for a given growing season 100, a parcel of land 110 (e.g., a farm) with three fields 120, 130, 140. For a given growing season, the grower may obtain field data for each of these fields 120-140. This field data is usually stored in a hierarchical folder structure, described in connection with FIG. 2. Over time, however, this grower may divide their available land into different fields having different geospatial boundaries compared to the fields used in prior growing seasons. For instance, FIG. 1B schematically illustrates the same parcel of land 110 for another growing season 101 with three fields 121, 131 and 141. A comparison of FIGS. 1A and 1B shows that the field boundaries for fields 121 and 141 in FIG. 1B differ from the field boundaries for fields 120 and 140 of FIG. 1A, while the field boundaries across seasons 100 and 101 remains the same for fields 130 and 131. These and other changes to field management over time presents challenges to the management and analysis of historical agricultural data. In addition to the complexity of tracking the grower's field data having different geospatial boundaries across growing seasons, this field data is typically stored in the hierarchical folder structure under the same or similar field name without reference to the differences in spatial boundaries across seasons.

Particularly, within a hierarchical data structure, historical agricultural data for a grower is typically stored as separate files within a file folder for a particular field where the agricultural activity took place. These activities include, for instance, seed identification; seed, soil and field treatments; and yield. Some growers obtain soil and tissue test data for their fields and this information is also stored as a file typically within a subfolder for the field from which the sample was derived. In addition to these files, a separate file storing field data is stored in the hierarchical folder structure. This file may be stored in a farm folder, as described herein.

The field data is typically defined by a field name and a set of geospatial boundaries that define the perimeter of the field. Consequently, the historical agricultural data files and the field data files are stored as separate files, and commonly in separate folders. Of course, hierarchal folder filing conventions are selected by the user storing the agricultural content, and the hierarchical data structure may be organized in a myriad of ways. Further, the user is responsible storing agricultural content within the various folders and sub-folders, which allows for the possibility of human error in storing files.

Figure 2:
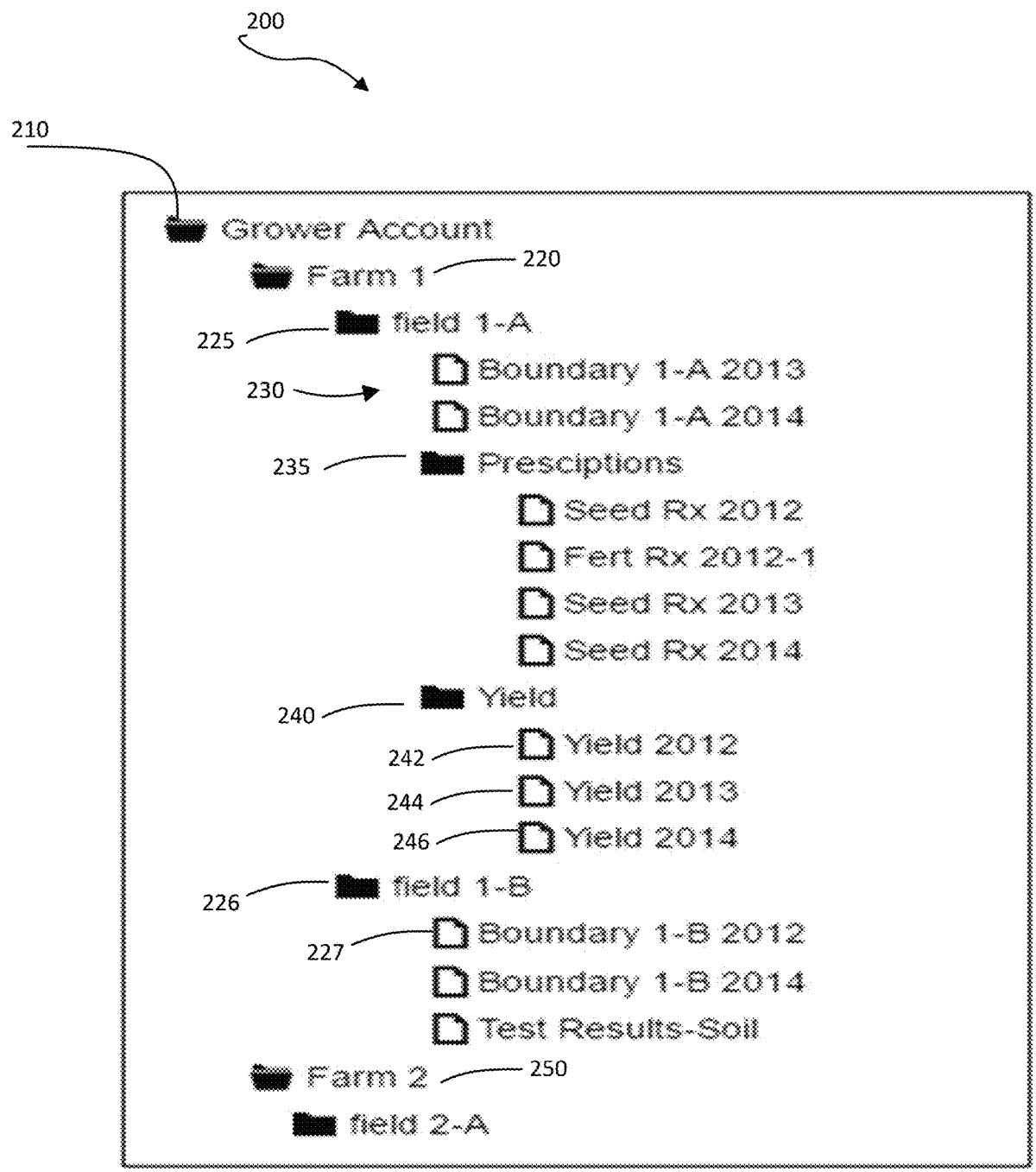
FIG. 2 schematically illustrates a legacy folder-style storage scheme for storing agricultural content according to prior approaches.

FIG. 2 schematically illustrates these prior approaches to storing agricultural content in a grower account using hierarchical folder structures. As shown in FIG. 2, the legacy folder-style storage scheme 200 for a grower account 210 includes Farm 1 and Farm 2. Data for Farm 1 is arranged hierarchically in folder 220, and data for Farm 2 is arranged hierarchically in folder 250. The Farm 1 folder 220 includes sub-folders 225, 226 for field 1-A and field 1-B, respectively. Agricultural content for field 1-A is stored in documents and sub-folders within sub-folder 225. For instance, field boundaries for field 1-A may be stored as files 230, while prescription files (e.g., seed and fertilizer treatments for historical growing seasons) may be stored in sub-folder 235. In another example, yield data for field 1-A may be stored in sub-folder 240, which may contain historical yield files 242, 244, 246 for historical growing seasons 2012, 2013, 2014, respectively. In this example, the yield file 242 includes yield data for both field 1-A and 1-B. While a similar folder/sub-folder structure may be used to store data for field 1-B in folder 226, however, as depicted in FIG. 2, the files within the sub-folder 226 for field 1-B does not display yield information for the field, even though file 227 (Boundary 1-B 2012) includes boundary information for this field in 2012, and thus yield data would be expected for this field. As mentioned, this problem may arise when a single yield file represents yield data for multiple fields. In the example of FIG. 2, the yield data for 2012 is stored only as file 242 within the yield sub-folder 240 for the folder 225 of field 1-A. Consequently, a search for yield data for field 1-B in 2012 would not produce results. In a further example, where a yield file is available for field 1-B in 2012, electronically searching for yield data for 2012 for Farm 1 would nonetheless require the user to conduct separate searches for yield data for each of fields 1-A and 1-B.

Management of historical field data thus presents challenges due to the hierarchical folder structure. Further, electronic searches of a grower's historical field data for a selected geographical area of the grower's land are difficult due to the data being stored according to the field, e.g., folders 225 and 226, within the hierarchical folder structure. As a result, a user may be unable to locate agricultural data that is spatially-correlated with their requirements, and the user may instead be required to conduct multiple searches and piece together the results. Moreover, this prior approach does not allow for spatial indexing.

Furthermore, precision agriculture techniques often involve an agricultural vehicle, such as a combine, collecting agricultural data using a sensor-based computerized data collection system as the vehicle traverses the grower's land. Typically, the operator of the vehicle is also responsible for data entry into the data collection system. Particularly, the vehicle operator tags the agricultural data collected with the particular field traversed. This approach facilitates organization of the grower's agricultural database because the data collected with the agricultural vehicle is associated, i.e., tagged, with a specific field name which can then be filed in the appropriate file folder described previously. Often times, these data collection systems are flawed in that, even where the vehicle operator traversed multiple fields, the data collection program permits only a single field name to be entered. By tagging the data for a single field, other fields traversed are not associated with the tag, and the agricultural data collected is uploaded to the grower's database for only the one field. As a result, the grower's historical agricultural data is incomplete for other fields traversed.

Implementations of the present disclosure address these complexities by providing approaches to spatially-indexing and storing historical agricultural content within a spatially-enabled database configured to organize and store agricultural content as spatial data. Providing a spatially-enabled database may overcome the challenges presented herein by, for instance, indexing and storing historical agricultural content according to a geospatial index. In a particular implementation, the database may store farm field information according to the geospatial boundaries of the field. For instance, the geospatial boundary information, e.g., GPS coordinates, defining the field boundaries may be the primary content associated with a field name. As provided herein, spatial indexing of agricultural content according to spatial field boundaries using data tables enables computer systems to simplify management and storage of large amounts of grower information, as opposed to indexing each individual GPS coordinate of agricultural content to each individual GPS coordinate of the field. The simplified storage enables the system to more efficiently index the agricultural content, and enables more efficient retrieval of geospatial search results.

Figure 3:
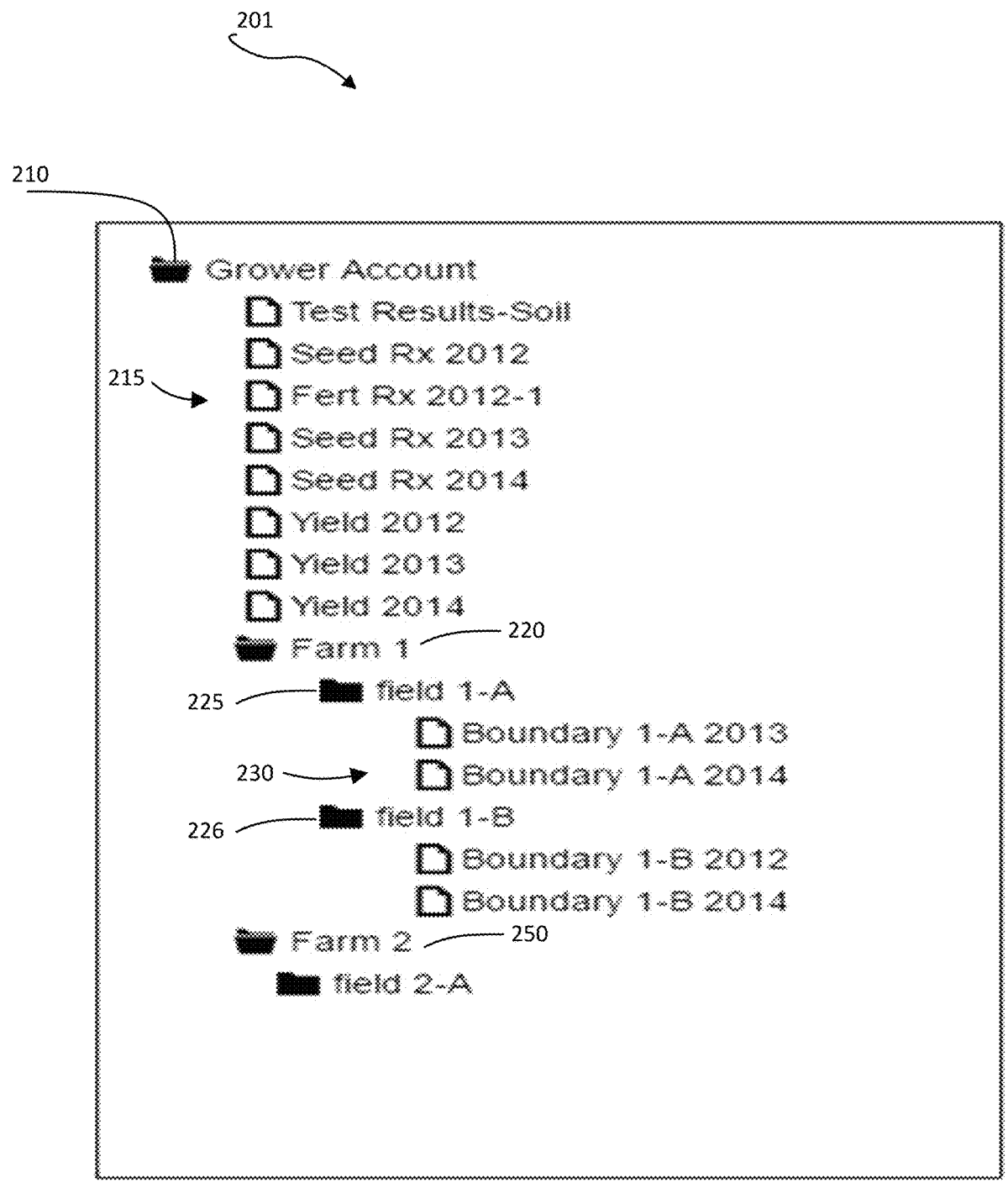
FIG. 3 schematically illustrates approaches to storing agricultural content in which agricultural content is indexed using geospatial boundary information, according to certain implementations.

FIG. 3 schematically illustrates approaches to storing historical agricultural content using a geospatial indexing scheme 200, according to certain implementations. The historical agricultural content is stored in a grower account folder 210, and as shown in FIG. 3, the grower account folder 210 includes folders 220 and 250 for Farm 1 and Farm 2, respectively, along with field boundary files 230 within subfolders for the fields, e.g., field files 225, 226, for each farm. However, the historical agricultural content stored in the grower account 210 is simply stored as files 215 within the grower account folder 210, and is not stored within the folders 220, 250 for each of Farms 1 and 2 or its subfolders. Storing the historical agricultural content simply within the grower account folder 210 is enabled due to the geospatial indexing scheme of the present disclosure.

Figure 4A:
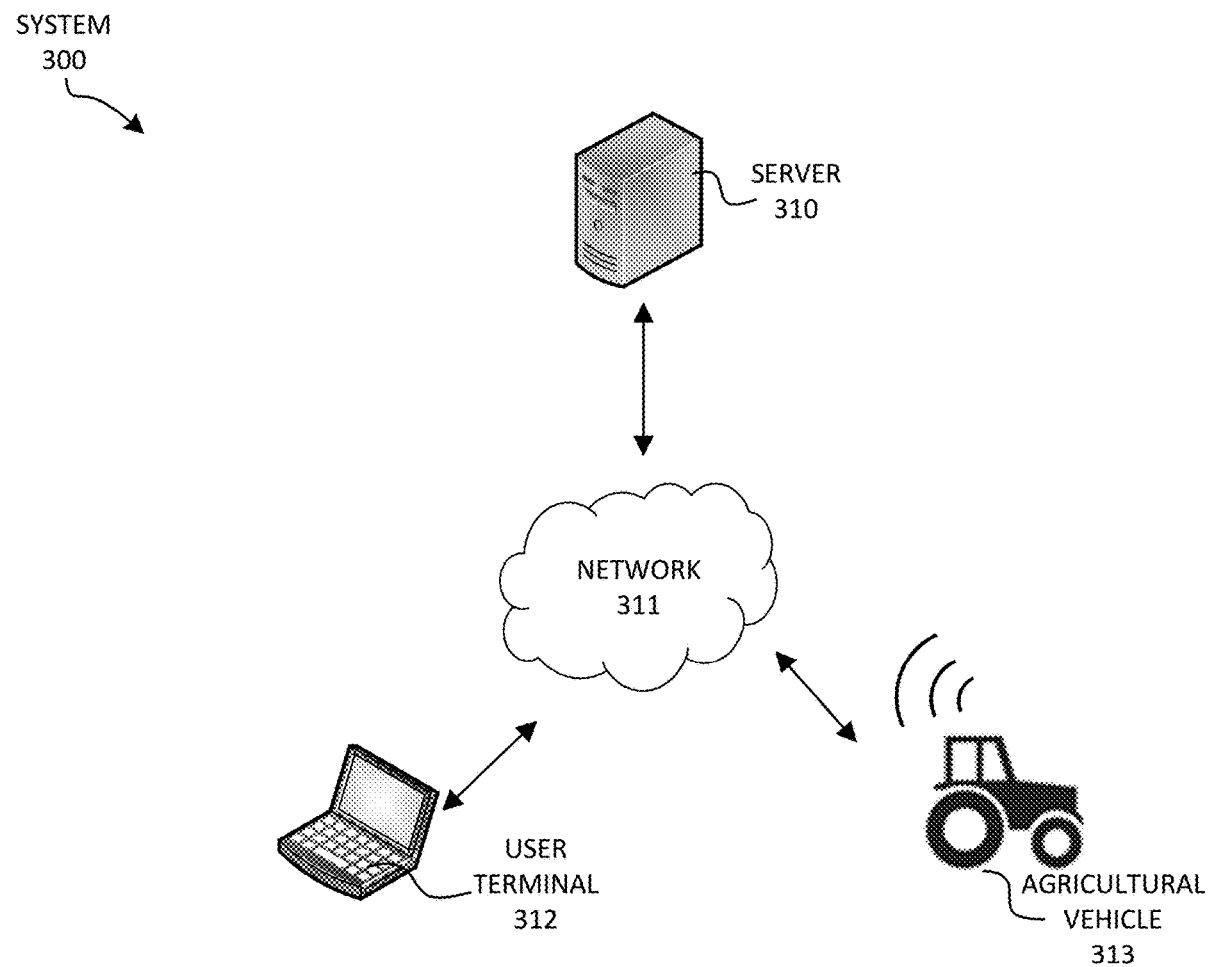
FIG. 4A illustrates an example system for spatially-indexing agricultural content according to certain implementations

FIG. 4A illustrates a system 300 for spatially-indexing agricultural content according to certain implementations. The system 300 may include a server 310 coupled to a communications network 311 for communicating with a user terminal 312 and an agricultural vehicle 313. The server 310 may be configured to organize and store agricultural content as spatial data. The user terminal 312 may be configured as a computer that includes memory, a processor and input devices such as a keyboard, mouse, electronic scanner or other sensing device communicatively coupled over the network 311. The system 300 may be communicatively coupled with an agricultural vehicle 313 over the network 311. The agricultural vehicle 313 may include an onboard computer coupled to sensing devices configured to sense and collect agricultural content. Various components of the system 300 may be stored local to or separate from one another.

The server 310 of the system 300 may be configured to store agricultural content as spatial data, for instance, using the data tables of FIGS. 5A-5F. One or more user interfaces may be implemented on the user terminal 312 of the system 300, and may be configured to enable a user to upload agricultural content that may be used by the system 300 to generate the data tables of FIGS. 5A-5F. The agricultural content may include raw or processed historical agricultural data which may additionally include field boundaries, inherent geospatial characteristics collected by an agricultural vehicle in connection with generating agricultural content, other agricultural data, other geospatial data, text data and other associated data. In some implementations, a user may add metadata to the agricultural content. The user terminal 312 may also be configured to enable a user to conduct geospatial searches of a grower account, e.g., of a farm or farms associated with the grower. For instance, a user may conduct a geospatial search by entering search parameters for a field name and season, field ID and season, season field ID, field coordinates, polygon coordinates, or may select other information corresponding to a geospatial area to be searched. Due to the spatially-indexed agricultural content, the system 300 queries the spatially-indexed agricultural content, identifies the fields corresponding to the geospatial search, and automatically provides results about the historical performance or use of various fields, e.g., the historical agricultural content, that corresponds to the search. An application programming interface (API) may be coupled to the system 300 and configured to allow external software applications to send and receive this data to the system 300. These external software applications may, for instance, operate on external computer systems communicatively coupled to the system 300.

The server 310 and the user terminal 312 of the system 300 each may be any device sufficient to implement and/or execute the systems and methods described herein, such as a server, PC, or mobile computing device. The network 311 of the system 300 may be a distributed network, such as the Internet, local area network, or other networks.

The agricultural vehicle 313 may be any vehicle adapted to traverse a parcel of land and sense and collect agricultural data. For instance, the agricultural vehicle 313 may be a tractor, a truck, an airborne vehicle, an unmanned aerial vehicle (e.g., drone). The agricultural vehicle 313 may include devices sufficient to implement and/or execute systems and methods for sensing and collecting agricultural content. For instance, the agricultural vehicle 313 may include a computer system such as an agricultural sensor system that includes one or more agricultural sensors for sensing agricultural content, along with a spatial tracking system (e.g., global positioning system (GPS)) for tracking the geospatial position of the agricultural vehicle 313. Agricultural sensors may include but are not limited to: cameras or video recorders such as HD cameras and video recorders, optical/RF sensors (e.g., for monitoring seed flow), weight pins (e.g., for down force sensing), flow sensors, moisture sensors, radar, infrared sensors, LiDAR sensor, temperature sensors, and/or depth sensors. Agricultural content that may be sensed by the sensors may include but is not limited to: yield, seed type; seed, soil and/or crop treatments (e.g., application of herbicides or fertilizers); soil test results; tissue test results; disease identification; pest identification; weed identification; moisture content, and so on.

The sensors may be positioned on the agricultural vehicle 313 or otherwise connectable to the agricultural vehicle 313 (e.g., via an adapter or a port of the agricultural vehicle 313, such as a USB port). The system of the agricultural vehicle 313 may send the data collected directly to the server 310; the data collected by the system of the agricultural vehicle 313 may be loaded into the server, for instance, via an API; or the data collected may be loaded to the user terminal 312, e.g., using a removable memory, and sent to the server 310.

The server 310, user terminal 312, and agricultural vehicle 313 may interact with or cause changes to each other over the network 311.

Figure 4B:
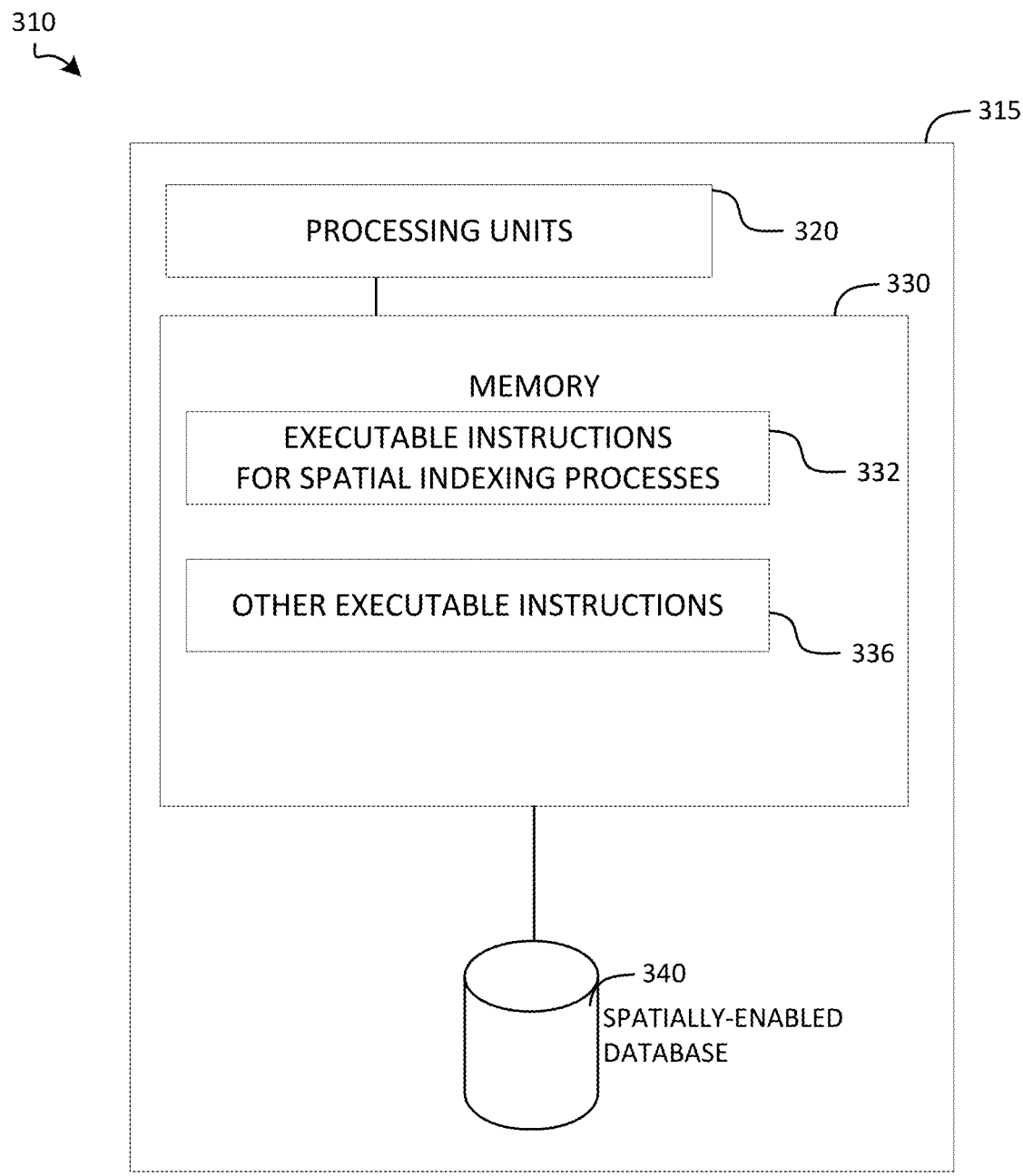
FIG. 4B illustrates an example system for spatially-indexing agricultural content according to certain implementations.

FIG. 4B is a schematic illustration of the server 310 arranged in accordance with examples described herein. The server 310 includes a computing device 315, which may include one or more processing units 320 and memory 330. The memory 330 may be encoded with executable instructions for spatial indexing processes 332 and/or other executable instructions 336. The computing device 315 may be in communication with the spatially-enabled database 340. In this manner, the computing device 315 may be programmed to provide some or all of the processes described herein.

It is to be understood that the arrangement of computing components is flexible. Although shown as contained in a single computing device, in some examples, the processing units 320, the memory 330 and the spatially-enabled database 340 may be provided on different devices in communication with one another. Although the executable instructions are shown encoded on a same memory, it is to be understood that in other examples a different computer readable media may be used and/or the executable instructions may be provided on multiple computer readable media and/or any of the executable instructions may be distributed across multiple physical media devices. The electronic storage for the spatially-enabled database 340 is shown as part of the computing device 315, but they may be separate. In other examples, the spatially-enabled database 340 may be stored separate from the computing device 315. In particular examples, the server 310 may be cloud-based, or its components may be cloud-based.

The computing device 315 may be implemented using generally any device sufficient to implement and/or execute the systems and methods described herein. The computing device 315 may, for example, be implemented using a computer such as a server, PC, or mobile computing device. In some examples, the computing device 315 may additionally or instead be implemented using one or more virtual machines. The processing unit(s) 320 may be implemented using one or more processors or other circuitry for performing processing tasks described herein. The memory 330 and spatially-enabled database 340 may be implemented using any suitable electronically accessible memory, such as a non-transitory computer-readable medium.

The executable instructions for spatial indexing processes 332, such as those described in relation to FIGS. 5A-5F, and other executable instructions 336 (e.g., geo-spatial searching processes), may be executed to provide or implement the systems and methods described herein. The executable instructions for such processes may be executed on the server 310, the user terminal 312, the agricultural vehicle 313, and/or combinations thereof.

In some embodiments, the executable instructions may be compiled to, interpreted to, represented as, stored in memory as, executed as, or otherwise configured as machine code selected from a specific machine language instruction set. The machine language instruction set may include native instructions recognized by the architecture of the processing unit(s) 320. The native instructions may specify, for example, registers for arithmetic, addressing, control, and other functions. Combinations of native instructions may form the basis of complex operations.

Agricultural content received into the server 310 of the system 300 may additionally include or contain geospatial attributes such as geometry primitives (e.g., point, line string, polygon (including a polygon with a polygon mask) or multipart geometries (e.g., multi-point, multi-line string, multiple polygons (including adjacent polygons, some of which may include a polygon with a polygon mask)). A point is defined by an x-y coordinate, and other geometry primitives and multi-part geometries are defined by sets of coordinates. In some particular implementations, the geospatial attributes may be polygons and points. These coordinates and coordinate-defined shapes may be x-y GPS coordinates. The geospatial attributes, received may include boundary information, such as in a shape file (.shp), GeoJSON ((.json or .geojson) an open standard format that represents geographical features and non-spatial attributes that is based on JavaScript Object Notation), or WKT (well-known text) format. Other agricultural content received may be a GeoJSON or shape file.

The server 310 of the system 300 executes instructions for indexing the agricultural content according to these geospatial attributes. According to one exemplary embodiment, agricultural content is received by the server 310 of the system 300 (e.g., via uploading or through an API call), and the server 310 associates the content with a predefined land area, such as a grower's property, a farm, a field, a portion of a field, or a coordinate of a field. In some approaches, electronic files containing agricultural content may be received by the server 310 having been tagged with a field name by a user. Rather than associating the agricultural content with the field name, however, the server 310 determines the current geometry of the field and indexes the agricultural content according to the geospatial boundaries of the field. In some implementations, the agricultural content is associated with a grower account, e.g., grower account folder 210, after the grower's account has been established, which, for instance may be established by the server 310 generating and populating farm, field, and geospatial field boundary tables, such as the tables depicted in FIGS. 5A-5C described herein.

In some embodiments, the server 310 associates the agricultural content received from the agricultural vehicle 313 by identifying geospatial attributes, such as inherent geospatial characteristics from the agricultural content, and cross-referencing these properties with the farm field coordinates, e.g., the polygon coordinates of FIG. 5C described herein. Inherent geospatial characteristics may be contained within the agricultural content collected by sensors or sensing systems coupled to the agricultural vehicle 313, described herein. For instance, these inherent geospatial characteristics may correspond, overlap, and/or intersect to a set of GPS coordinates for a field or group of fields traversed by an agricultural vehicle during collection of the agricultural content. The geospatial location may represent an area over which the agricultural vehicle 313 traversed during collection of the agricultural content, and for instance, may correspond to or overlap with a field. In particular, the sensors or sensing systems coupled to the agricultural vehicle 313 may include a computer system with one or more agricultural sensors and a spatial tracking system (e.g., GPS system) for tracking the geospatial position of the agricultural vehicle 313 as the agricultural content is sensed and collected. In some implementations, the agricultural sensors and spatial tracking system may be integrated into the same sensing system, while in other implementations these may be separate. Whereas in prior approaches, a tractor operator may only tag agricultural content collected by the agricultural vehicle with a field name for subsequent storage in a hierarchical folder structure, in the implementations of the present disclosure, the agricultural content collected is geospatially-indexed by the server 310.

Over time, for instance, with each successive growing season, the table of FIG. 5C described herein may be updated with season field IDs for each field managed. Depending on the geospatial area covered for the field for the growing season, the polygon coordinates representing agricultural field boundaries may be the same or different from other growing seasons. In some further implementations, the server may store multiple versions of field boundaries for a given field for a given growing season. This may be useful when multiple users manage a grower account and enter different field boundary information for the same field and season.

FIGS. 5A-5F illustrate data tables that may be used in connection with the geospatial indexing scheme of the present disclosure for indexing historical agricultural content and other grower information using geospatial boundary information, according to certain implementations. The table of FIG. 5A illustrates a table representing a grower account with Farm 1 and Farm 2 with farm ID 1001 representing Farm 1 and farm ID 1002 representing Farm 2. The table represents two farms for a grower account, however, information for additional farms for a grower account may populate the table.

The table of FIG. 5B illustrates columns for Farm ID, Field ID and Field Name and rows for the different farm's corresponding fields. In the first two rows, this figure illustrates that farm 1, i.e., with Farm ID 1001, includes two fields, 10011 and 10012, corresponding to fields 1-A and 1-B, respectively; and in the third row illustrates that farm 2 includes one field, 10021, corresponding to field 2-A. The table represents two farms with three total fields for a grower account, however, information for additional farms and fields for a grower account may populate the table.

The table of FIG. 5C illustrates instances of a field of a grower's farm used for a given season. The table includes columns for season field ID, field ID, season, and polygon coordinates representing the field. For purposes of illustration only, FIG. 8 depicts the table of FIG. 5C along with visual depictions of fields for the various given seasons based on the polygon coordinates listed in the table. As illustrated, five different fields for three different growing seasons are depicted in the table, however, information for additional fields and growing seasons may populate the table. According to implementations, the table of FIG. 5C stores field information according to geospatial boundaries of the field. Particularly, the table stores the field information according to the geospatial boundaries of the field for a given field ID for a growing season using a season field ID. For instance, season field ID 31 represents field 1-A of Farm 1 for growing season 2012 with a set of coordinates that represent the geospatial boundaries of the field. In addition, based on the polygon coordinates for season 2012 for field ID 10011 and 10021, these fields are adjacent to one another. Similarly, for season 2014 for field ID 10011 and 10021, the square-shaped field (10021) nests within the opening of the U-shaped field (10011).

The table of FIG. 5D illustrates historical agricultural content stored according to geospatial boundaries from which the agricultural content was derived. For purposes of illustration only, FIG. 9 depicts a portion of the table of FIG. 5D with a visual depiction of the geospatial area covered related to the agricultural resource ID based on the polygon coordinates listed in the table. As illustrated in FIG. 5D, the agricultural content stored includes yield, seed prescription and fertilizer prescription data, however, other agricultural content may be stored in this table. The table includes columns for agricultural resource ID, growing season, type of agricultural content, and polygon coordinates representing the geospatial boundaries from which the agricultural content was derived. In some implementations, the polygon coordinates used in this table may be derived from the inherent geospatial characteristics collected by an agricultural vehicle traversing land on a farm in connection with generating agricultural content. The area traversed by the vehicle may correspond to GPS coordinates, which implies geospatial boundaries within which the agricultural content was generated. These geospatial boundaries may define the polygon coordinates of FIG. 5D. The geospatial boundaries for the agricultural content stored may geospatially cover, overlap or intersect one field, multiple fields or a partial field for a farm.

In implementations, the server 310 may generate a geospatially-indexed table by indexing the agricultural activity type (e.g., yield, seed treatment, fertilizer treatment) against a Season Field ID and may generate the table of FIG. 5E. Particularly, because the server 310 generates the table of FIG. 5C in which the fields for the farms of the grower's account are geospatially-indexed according to growing season, the server 310 analyzes these geospatial boundaries of the fields against the geospatially-indexed agricultural content of FIG. 5D and identifies the fields where the agricultural activity took place. The server 310 then indexes the agricultural activity to the field and season, for instance, by generating a table that indexes the Season Field ID against the agricultural activity, e.g., the agricultural resource ID, as depicted in FIG. 5E. Because the Season Field ID corresponds to a set of geospatial coordinates (see x-y GPS coordinates in polygon column FIG. 5C), and the Agricultural Resource ID corresponds to a set of geospatial coordinates (see x-y GPS coordinates in polygon column of FIG. 5D), the server 310 is able to proceed with geospatial indexing for the different fields for a given growing season. Accordingly, the server 310 indexes the agricultural content according to growing season and the geospatial boundaries of the field for that season. Over multiple growing seasons, and while field boundaries may change, due to the server 310 indexing the agricultural content for the field according to its geospatial boundaries for the given growing season, the discrete area from which the agricultural content was derived is represented spatially in the spatial index. Consequently, the table of FIG. 5E may include information for multiple growing seasons. In one particular example, and with reference to FIGS. 5C-5E, the yield for the 2012 growing season is recorded for the geospatial area corresponding to the coordinates in the first row of the table of FIG. 5D with the agricultural resource ID of 201. By querying the geospatial coordinates of the season fields of table of FIG. 5C, the server 310 determines these coordinates for the yield data overlap with the coordinates for Fields 1-A and 2-A, which are assigned season field ID 31 and 34. The server 310 then generates the first two rows of the table of FIG. 5E. In addition to yield, e.g., overall yield, the server 310 may proceed by indexing other agricultural content according to growing season in the same manner.

In further embodiments, the server 310 may generate a geospatially-indexed table by indexing the agricultural activity type (e.g., yield, seed treatment, fertilizer treatment) against a Field ID and may generate the table of FIG. 5F. Similar to the approach to indexing described in connection with FIG. 5E, the agricultural content received by the server 310 may overlap all or part of a field or fields. Where the agricultural content includes information for a portion of a field, the server 310 may associate the agricultural content with the field and index the information for the geospatial boundaries of the entire field. Where the agricultural content includes information for multiple fields, the server 310 may associate the agricultural content to all such fields and indexes the information according to the geospatial boundaries of the field. For instance, using the table of FIG. 5C, the server 310 analyzes these geospatial boundaries of the fields against the geospatially-indexed agricultural content of FIG. 5D and identifies the fields where the agricultural activity took place. The server 310 then indexes the agricultural activity to the fields only, for instance, by generating a table that indexes the Agricultural Resource ID against the Field ID, as depicted in FIG. 5F. Because the Field ID corresponds to sets of geospatial coordinates (see FIG. 5C) for different growing seasons, and the Agricultural Resource ID corresponds to a set of geospatial coordinates (see FIG. 5D), the server 310 is able to generate the geospatial indexing for the different fields. Accordingly, the server 310 indexes the agricultural content according to the geospatial boundaries of the field for a given agricultural resource for the agricultural resource's growing season. Over multiple growing seasons, the server 310 geospatially-indexes the agricultural content to the field as long as the spatial coordinates of the agricultural content overlaps, intersects or corresponds to the geospatial coordinates of a field for at least one growing season. Consequently, the table of FIG. 5E may include information for multiple growing seasons based on the Agricultural Resource ID representing information for a given growing season, but this information may be associated with the Field ID which may represent geospatial coordinates across multiple growing seasons. In one particular example, and with reference to FIGS. 5C-5D and 5F, the yield for the 2012 growing season is recorded for the geospatial area corresponding to the coordinates in the first row of the table of FIG. 5D with the agricultural resource ID of 201. By querying the geospatial coordinates of the season fields of table of FIG. 5C, the server 310 determines these coordinates for the yield data overlap with the coordinates for Fields 1-A and 2-A, which are assigned field ID 10011 and 10021. The server 310 then generates the first two rows of the table of FIG. 5F. The server 310 may proceed by indexing other agricultural content in the same manner. As shown in the right column of FIG. 5F, because the agricultural resource IDs span geospatial coordinates for two fields, the Field ID column includes field IDs for only two fields. This is in contrast to FIG. 5E in which the Fields IDs are further managed according to season such that the Season Field IDs column includes IDs for four season fields.

In some implementations, the agricultural content may be more broadly indexed to the geospatial boundaries of the farm, e.g., by generating a table with a Farm ID column and an agricultural resource ID column. In addition or alternatively, the total land parcel of the grower account may be indexed with the agricultural content. In further implementations, agricultural content may be more narrowly associated with a specific GPS location within the geospatial boundaries of the field and this agricultural content may be indexed by its GPS location within the field. For instance, a table with a geospatial coordinate column and an agricultural resource ID column may be generated.

In some approaches, the server 310 receives agricultural content that originally does not include spatial information. In this case, the server may receive geospatial properties, or information that is associated with geospatial properties, and indexes the agricultural content based on the received properties. These geospatial properties may be manually entered by a user. In a particular example, non-spatial data (such as a .pdf or .docx file) may include agricultural content, but the non-spatial data does not contain inherent geospatial characteristics. However, a user may enter geospatial coordinates, a field name, a field ID, optionally along with a growing year, and the server 310 may index the non-spatial data according to the geospatial properties assigned thereto by identifying a farm and/or a field with geospatial boundaries that overlap, intersect, or match the geospatial properties assigned to the non-spatial data in a manner similar to the indexing approaches described in connection with FIGS. 5E and 5F. In another example, the user may append an approximate land area from which the agricultural content was derived. This approximation may, for instance, be according to field or by identifying a location on a map of the land parcel. The server 310 may spatially correlate the approximation with the geospatial boundaries of field and index the content according to these boundaries. Consequently, according to embodiments, any agricultural content received by the system, regardless of whether it includes inherent geospatial characteristics, may be spatially-indexed. However, in embodiments where no spatial correlation is identified, the server 310 may store the agricultural content in a non-spatially-indexed location of the grower account.

Spatial indexing may additionally involve indexing according to an elevation or depth. For instance, the indexing engine may index moisture for a given GPS coordinate at a given depth below the soil, e.g., 6 inches and 12 inches below the soil. The server 310 may thus index soil attributes according to spatial location including depth, and air temperature and humidity according to spatial location including elevation. In this example, the server 310 may generate a data table similar to the table of FIG. 5D for defining agricultural content geometry but the polygon column with x-y GPS coordinates may additionally include z-coordinates. For instance, z-coordinates, as with x-y coordinates, may be sensed by an agricultural sensor. In addition or alternatively, z-coordinates may be generated by drawing an inference based on the typical height of the agricultural content, e.g., plant, or the typical depth at which moisture samples are taken, e.g., soil wetness samples, and the inferred z-coordinates may be merged with the x-y GPS coordinates. Similarly, the table of FIG. 5C may be generated for defining season field geometry, but the polygon column with x-y GPS coordinates may additionally include z-coordinates. Consequently, the server 310 may generate a geospatially-indexed table in three-dimensions by indexing the x-y-z GPS coordinates for the agricultural activity type (e.g., yield, seed treatment, fertilizer treatment) against the x-y-z GPS coordinates for a Season Field ID and may generate the table of FIG. 5E and/or may generate the table of FIG. 5F.

While implementations provide approaches for indexing agricultural content using geospatial boundaries of a field, other collected content may also be spatially-indexed using geospatial boundaries of a field. For instance, collected content may include geospatial content such as land erosion and surface runoff information, which may be spatially-indexed according to the present disclosure. The collected content may be sensed by a sensing system that includes a spatial tracking system, and the sensing system may be coupled to any vehicle suitable for use in sensing the collected content.

Figure 6:
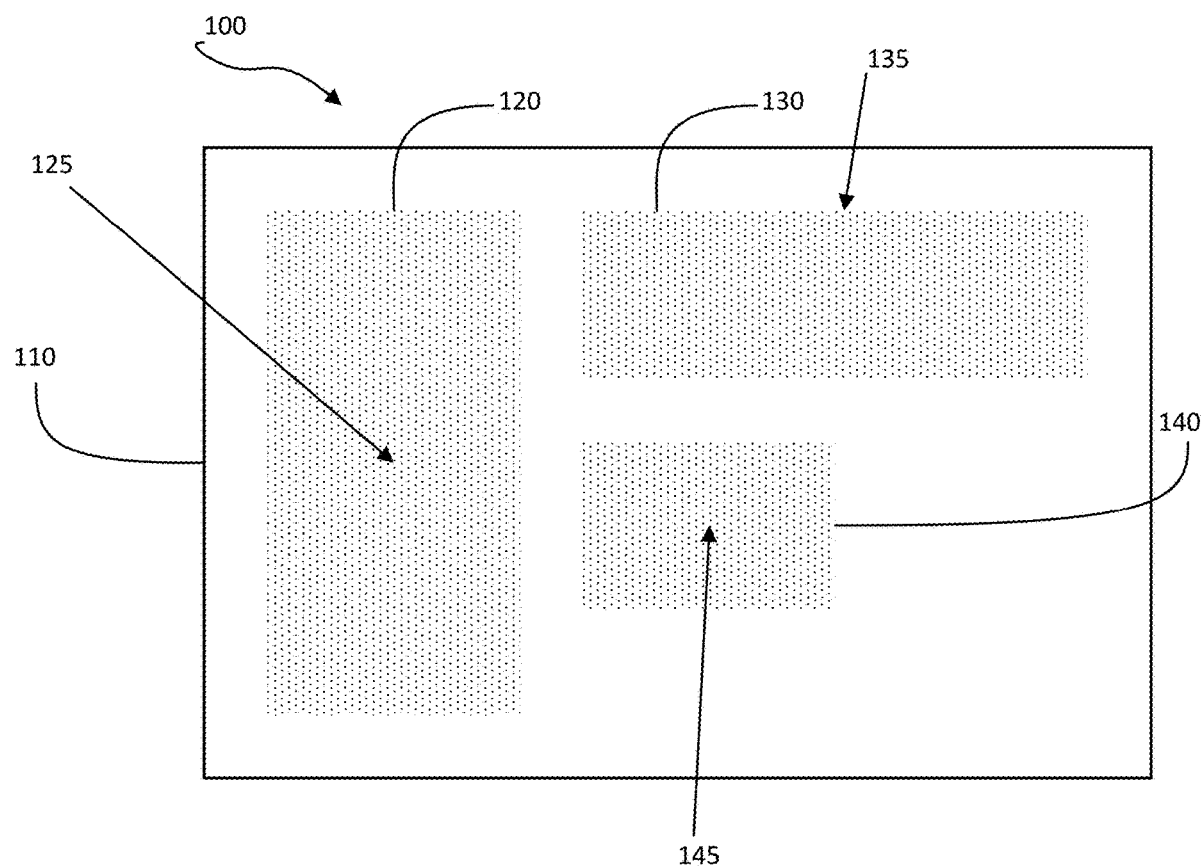
FIG. 6 schematically illustrates the three fields on the parcel of land for the given growing season of FIG. 1A that has been spatially-indexed according to certain implementations.

FIG. 6 schematically illustrates the three fields 120-140 on the parcel of land 110 for the growing season 100 represented by FIG. 1A that has been spatially-indexed. Field 120 may be defined by spatially-correlated coordinates 125 covering an area of the field 120, field 130 may be defined by spatially-correlated coordinates 135 covering an area of the field 130, and field 140 may be defined by spatially-coordinated coordinates 145 covering an area of the field 140. For instance, these fields may correspond to the fields indexed in FIG. 5C. Particularly, the spatially-enabled computer system, such as system 300, generates a correlation between the parcel of land 110 and the agricultural content, e.g., by generating tables of FIGS. 5A-5C for the fields, generating the table of FIG. 5D after receipt of agricultural content for a growing season (e.g., yield and seed, soil, or crop treatment), and cross referencing the geospatial coordinates of FIGS. 5C and 5D to generate the spatially correlated tables of FIGS. 5E and 5F. Accordingly, the server 310 may identify field boundary information for each respective field 120-140, as well as agricultural content collected for each field. Thus, the server 310 indexes the agricultural content for field 120 according to the geospatial boundaries of the field 120, indexes the agricultural content for field 130 according to the geospatial boundaries of the field 130, and indexes the agricultural content for field 140 according to the geospatial boundaries of the field 140. In the preceding example, the agricultural content for each of fields 120-140 may be provided to the server 310 as three different sets of agricultural content (e.g., three different .geojson files, one set for each field 120-140), and each file may be indexed accordingly. However, in a further example, where a single set of agricultural content, e.g., a single .geojson file, is received by the server 310 that includes inherent geospatial characteristics corresponding to the spatial coordinates for each of the three fields, 120-140, then the single set of agricultural content is indexed to the geospatial boundaries of each field 120, 130 and 140.

Figure 7:
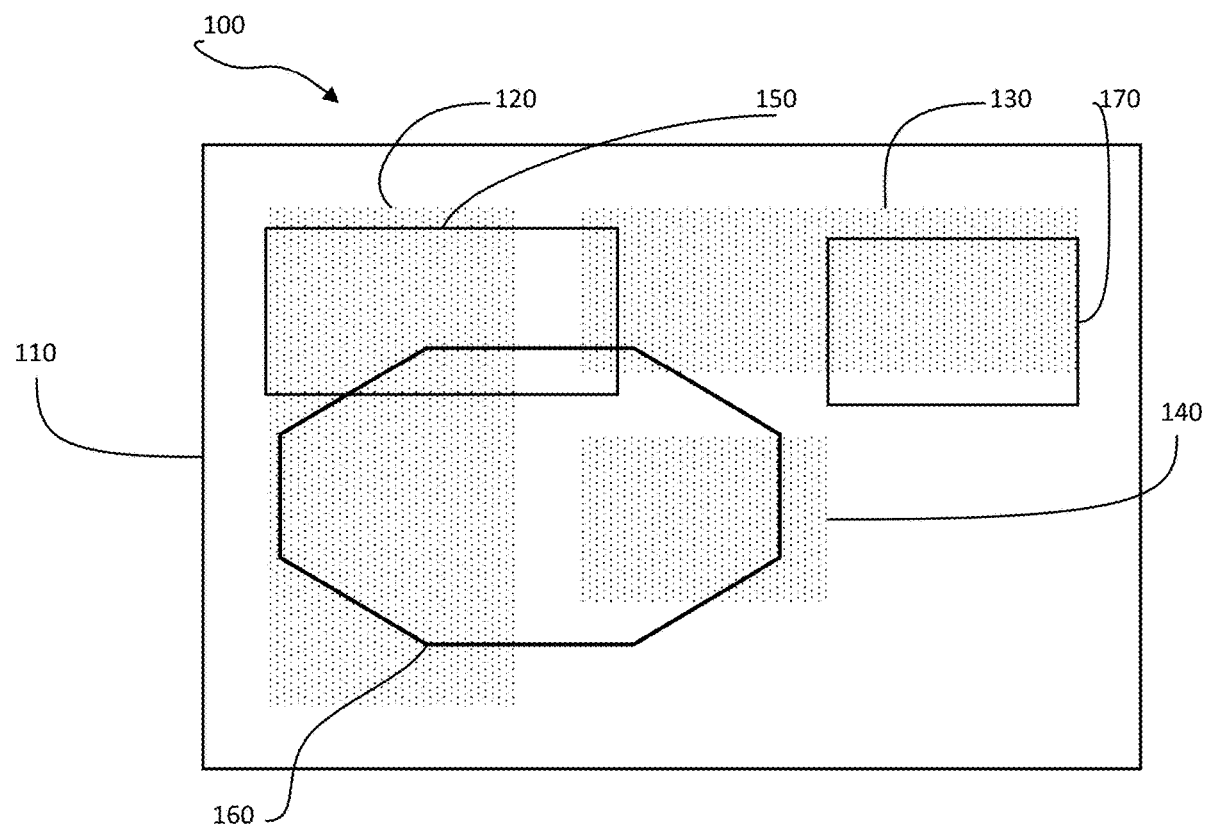
FIG. 7 schematically illustrates geospatial searching that may be performed on fields that have been spatially-indexed according to certain implementations.

FIG. 7 schematically illustrates a portion of a graphical user interface 400 that may be displayed in connection with performing a geospatial search of the parcel of land 110 that has been spatially-indexed according to certain implementations. The graphical user interface 400 includes geospatial searches 150, 160 and 170. The spatial search parameters may correspond to one or more of field coordinates, polygon coordinates, or GPS coordinates of the spatial area to be searched (e.g., x-y or x-y-z GPS coordinates). In some approaches, a field name and season, field ID and season, or season field ID may be received as search parameters, and the system may identify the coordinates corresponding to a geospatial area and execute the geospatial search using the identified coordinates.

Geospatial search 150 covers a spatial area corresponding to spatially-indexed agricultural content within the geospatial boundaries of the fields 120 and 130. As a result, the system 300 generates search results identifying the agricultural content indexed for fields 120 and 130. In prior approaches, where field data for the growing season was stored in a hierarchical data structure, conducting the geospatial search 150 would not have been possible, and instead the user would have been required to search by keyword using multiple searches for the two different fields, i.e., fields 120 and 130, and combining the results. In contrast, by conducting geospatial search 150 using the spatially-enabled computer system, only a single search of the spatial area of interest is needed in order to obtain agricultural information corresponding to the spatially-indexed agricultural content. Similarly, geospatial search 160 covers a spatial area corresponding to a spatial area covering fields 120, 130 and 140. In contrast to prior approaches where at least three separate searches would have been required, i.e., at least one for each field 120-140, only a single search of the spatial area 160 is required using the spatially-enabled computer network in order to generate search results identifying agricultural content indexed for fields 120-140. Turning to geospatial search 170, this search covers a spatial area corresponding to a portion of the spatially-indexed data points within field 130. Consequently, geospatial search 170 produces search results identifying the agricultural content indexed for field 130.

In further approaches, where the agricultural content is indexed according to specific GPS locations within the geospatial boundaries of the field, searching portions of a field, such as in geospatial search 170, may provide search results for only the portion of the geospatial area searched, or may provide search results for the field that overlaps with the search, i.e., field 130, as well as the portion of the geospatial area searched within this field.

In performing a geospatial search of the parcel of land 110 that has been spatially-indexed, according to further implementations, the results of the search may be provided to other tools such as an analytics engine. In such approaches, the search results may be transmitted to the tool for further processing, which may be in addition or an alternative to displaying the search results.

In the present disclosure, the methods disclosed may be implemented as sets of instructions or software readable by a device. Further, the specific order or hierarchy of steps in the methods disclosed are examples of sample approaches and the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter. The form described is merely explanatory, and it is the intention of the following claims to encompass and include such changes.

While the present disclosure has been described with reference to various embodiments, it will be understood that these embodiments are illustrative and that the scope of the disclosure is not limited to them. These and other variations, modifications, additions, and improvements may fall within the scope of the disclosure as defined in the claims that follow.

What is claimed is:

1. A computer-implemented method of spatially indexing agricultural content for a plurality of growing seasons to geospatial boundaries of a plurality of fields, the method comprising:
    inputting agricultural content from memory operatively coupled with a computer system, the agricultural content comprising spatial data for a plurality of growing seasons;
    inputting field data for the plurality of fields from the memory operatively coupled to the computer system, the field data comprising geospatial boundaries and a growing season associated with the geospatial boundaries;
    spatially-indexing the agricultural content by:
        identifying from the spatial data a set of geospatial boundaries for the agricultural content; and
        indexing the agricultural content to the identified set of geospatial boundaries;

cross-referencing the geospatial boundaries of the spatially-indexed agricultural content for the plurality of growing seasons with a plurality of sets of geospatial boundaries for the plurality of fields for each of the plurality of growing seasons, wherein at least one of the plurality of sets of geospatial boundaries for at least one of the plurality of fields differs for at least one of the plurality of growing seasons,
  wherein when the cross-referencing identifies an overlap between the spatially-indexed agricultural content for a growing season of the plurality of growing seasons and geospatial boundaries of a field from the plurality of fields, indexing the agricultural content for the growing season to the field, and
  wherein when the cross-referencing identifies an overlap between the spatially-indexed agricultural content for a growing season of the plurality of growing seasons and the geospatial boundaries of two or more of the plurality of fields, indexing the agricultural content for the growing season to each of the two or more of the plurality of fields.

2. The method of claim 1, wherein the plurality of sets of geospatial boundaries for a plurality of fields are contained in a data table, the data table comprising columns for field identifiers and for geospatial coordinate identifiers, and wherein each of a plurality of rows of the data table identifies an individual field and a set of geospatial coordinates defining the set of geospatial boundaries for the individual field.

3. The method of claim 1, wherein the step of indexing the agricultural content to the identified geospatial boundaries comprises outputting the indexed content to a data table, the data table comprising columns for agricultural content type identifiers and for geospatial coordinate identifiers, and wherein each of a plurality of rows of the data table identifies an agricultural content type and a set of geospatial coordinates defining the set of geospatial boundaries for the agricultural content.

4. The method of claim 1, wherein the agricultural content comprises sensed agricultural content from an agricultural sensor system of an agricultural vehicle.

5. The method of claim 4, wherein the spatial data of the agricultural content comprises inherent geospatial characteristics collected by the agricultural sensor system.

6. The method of claim 5, wherein the inherent geospatial characteristics comprise x-y GPS coordinates.

7. The method of claim 6, wherein each of the sets of geospatial boundaries for the plurality of fields comprises x-y GPS coordinates.

8. The method of claim 5, wherein the inherent geospatial characteristics comprise x-y-z GPS coordinates.

9. The method of claim 8, wherein each of the sets of geospatial boundaries for the plurality of fields comprises x-y-z GPS coordinates.

10. The method of claim 1, further comprising the steps of:
  receiving spatial search parameters from an interactive display;
  identifying one or more fields from the spatial search parameters using the plurality of sets of geospatial boundaries for the plurality of fields; and
  displaying for each of the plurality of growing seasons, the indexed agricultural content corresponding to the identified one or more fields.

11. The method of claim 10, wherein the spatial search parameters received correspond to one or more of field coordinates, polygon coordinates, or GPS coordinates.

12. A computer system comprising:
  a database in communication with a computer processor, the database comprising memory for storing agricultural content and field data for a plurality of fields, the agricultural content comprising spatial data for a plurality of growing seasons, the field data comprising geospatial boundaries and a growing season associated with the geospatial boundaries, wherein the database includes a non-transitory computer-readable medium;
  the computer processor configured to spatially-index the agricultural content, wherein the computer processor:
    identifies from the spatial data a set of geospatial boundaries for the agricultural content;
    indexes the agricultural content to the identified set of geospatial boundaries; and
    cross-references the geospatial boundaries of the spatially-indexed agricultural content for the plurality of growing seasons with a plurality of sets of geospatial boundaries for the plurality of fields for each of the plurality of growing seasons, wherein at least one of the plurality of sets of geospatial boundaries for at least one of the plurality of fields differs for at least one of the plurality of growing seasons,
      wherein when the cross-referencing identifies an overlap between the spatially-indexed agricultural content for a growing season of the plurality of growing seasons and geospatial boundaries of a field from the plurality of fields, the processor indexes the agricultural content for the growing season to the field, and
      wherein when the cross-referencing identifies an overlap between the spatially-indexed agricultural content for a growing season of the plurality of growing seasons and the geospatial boundaries of two or more of the plurality of fields, the processor indexes the agricultural content for the growing season to each of the two or more of the plurality of fields.

13. The computer system of claim 12, wherein the computer processor is operatively coupled to an interactive display, the computer processor is further configured to:
  receive spatial search parameters from the interactive display;
  identify one or more fields from the spatial search parameters using the plurality of sets of geospatial boundaries for the plurality of fields; and
  display for each of the plurality of growing seasons, the indexed agricultural content corresponding to the identified one or more fields.

14. The computer system of claim 13, wherein the spatial search parameters received correspond to one or more of field coordinates, polygon coordinates, or GPS coordinates.

* * * * *